United States Patent
Wang et al.

(10) Patent No.: US 12,149,952 B2
(45) Date of Patent: Nov. 19, 2024

(54) NEIGHBOR CELL PLANNING METHOD AND DEVICE BASED ON THIESSEN POLYGON

(71) Applicant: NANJING HOWSO TECHNOLOGY CO., LTD., Jiangsu (CN)

(72) Inventors: Jibin Wang, Nanjing (CN); Lu Hou, Nanjing (CN); Dalong Chen, Nanjing (CN)

(73) Assignee: NANJING HOWSO TECHNOLOGY CO., LTD., Jiangsu (CN)

( * ) Notice: Subject to any disclaimer, the term of this patent is extended or adjusted under 35 U.S.C. 154(b) by 331 days.

(21) Appl. No.: 17/616,164

(22) PCT Filed: Jun. 24, 2020

(86) PCT No.: PCT/CN2020/097971
§ 371 (c)(1),
(2) Date: Dec. 2, 2021

(87) PCT Pub. No.: WO2021/042829
PCT Pub. Date: Mar. 11, 2021

(65) Prior Publication Data
US 2022/0256355 A1   Aug. 11, 2022

(30) Foreign Application Priority Data
Sep. 3, 2019  (CN) .......................... 201910829224.6

(51) Int. Cl.
*H04W 16/18*   (2009.01)
*H04W 4/021*   (2018.01)

(52) U.S. Cl.
CPC .......... *H04W 16/18* (2013.01); *H04W 4/022* (2013.01)

(58) Field of Classification Search
CPC .............................. H04W 4/022; H04W 16/18
(Continued)

(56) References Cited

U.S. PATENT DOCUMENTS

2009/0010493 A1* 1/2009 Gornick ........... G08B 13/19641
382/103
2013/0094397 A1   4/2013 Kim et al.
(Continued)

FOREIGN PATENT DOCUMENTS

| CN | 102036254 A | 4/2011 |
| CN | 102083075 A | 6/2011 |

(Continued)

OTHER PUBLICATIONS

International Search Report (English and Chinese) and Written Opinion (Chinese) of the International Searching Authority issued in PCT/CN2020/097971, mailed Sep. 2, 2020; ISA/CN (9 pages).
(Continued)

*Primary Examiner* — Christopher M Crutchfield
*Assistant Examiner* — Jean F Voltaire
(74) *Attorney, Agent, or Firm* — Harness, Dickey & Pierce, P.L.C.

(57) ABSTRACT

Neighbor cell planning method and device based on Thiessen polygons are provided. The method includes acquiring working parameter data of cells; adjusting longitudes and latitudes of the cells based on the working parameter data; constructing a Delaunay triangulation based on the adjusted longitudes and latitudes of the cells; generating Thiessen polygons based on the Delaunay triangulation; and calculating neighbor cells of each cell based on the Thiessen polygons and exporting a list of neighbor cells for each cell.

14 Claims, 6 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2015/0302123 | A1* | 10/2015 | Gloss | H04L 43/045 |
| | | | | 703/13 |
| 2017/0251414 | A1* | 8/2017 | Ghazi-Moghadam | ........................ |
| | | | | H04W 36/00835 |
| 2018/0007593 | A1* | 1/2018 | Gormley | H04W 16/24 |
| 2019/0166542 | A1 | 5/2019 | Huang et al. | |

FOREIGN PATENT DOCUMENTS

| | | | |
|---|---|---|---|
| CN | 102547767 | A | 7/2012 |
| CN | 102572854 | A | 7/2012 |
| CN | 106034333 | A | 10/2016 |
| CN | 108564285 | A | 9/2018 |
| CN | 110536307 | A | 12/2019 |
| WO | WO-2016049592 | A1 | 3/2016 |
| WO | 2018028226 | A1 | 2/2018 |

OTHER PUBLICATIONS

Office Action regarding Chinese Patent Application No. 2019108292246, dated Mar. 5, 2021.

\* cited by examiner

NEIGHBOR CELL PLANNING METHOD AND DEVICE BASED ON THIESSEN POLYGON

This application is the national phase of International Patent Application No. PCT/CN2020/097971, titled "NEIGHBOR CELL PLANNING METHOD AND DEVICE BASED ON THIESSEN POLYGON", filed on Jun. 24, 2020, which claims priority to Chinese Patent Application No. 201910829224.6, titled "NEIGHBOR CELL PLANNING METHOD AND DEVICE BASED ON THIESSEN POLYGON", filed on Sep. 3, 2019 with the China National Intellectual Property Administration (CNIPA), both of which are incorporated herein by reference in their entireties.

FIELD

The present disclosure relates to the field of communication, and in particular to a neighbor cell planning method and device based on Thiessen polygon.

BACKGROUND

Wireless network planning for mobile communication is the basis of wireless network construction, which includes coverage prediction, capacity prediction, interference analysis, traffic analysis, neighbor cell planning, cell parameter planning and the like. The purpose of the neighbor cell planning is to ensure that a mobile phone at a service boundary of a cell is capable of switching to a neighbor cell providing better service in time, so as to ensure the continuity and quality of phone calls and the performance of the network. Therefore, the neighbor cell planning is a very important part in the wireless network planning.

The conventional neighbor cell planning is generally performed manually. That is, through a simulation result of statistical interference analysis, coverage of each cell in a to-be-planned area and a pilot carrier of each point lattice are acquired. For each point lattice, based on a set number N of cells covered by the point lattice, the first N cells from which the point receives signals with highest strength are determined through coverage prediction to establish a list of neighbor cells for a service cell of the point. With the expansion of the scale of the mobile network, the neighbor cell planning requires a lot of manpower and time. With the conventional method, the planning efficiency is low, and the planning result is greatly affected by human factors, resulting in low data reliability.

SUMMARY

In view of the above, a neighbor cell planning method and device based on Thiessen polygons are provided according to the embodiments of the present disclosure to perform neighbor cell planning rapidly, saving manpower and time, avoiding the inaccuracy of manual planning, reducing the cost of neighbor cell planning, and improving the accuracy and efficiency of the neighbor cell planning.

In order to solve the above problems, a neighbor cell planning method based on Thiessen polygons is provided according to an embodiment of the present disclosure. The method includes:

acquiring working parameter data of cells;
adjusting longitudes and latitudes of the cells based on the working parameter data;
constructing a Delaunay triangulation based on the adjusted longitudes and latitudes of the cells;
generating Thiessen polygons based on the Delaunay triangulation; and
calculating neighbor cells of each cell based on the Thiessen polygons and exporting a list of neighbor cells for each cell.

With the above technical solution, the Delaunay triangulation is constructed based on the acquired working parameter data to obtain Thiessen polygons. Neighbor cells of each cell is calculated and a list of neighbor cells for each cell is exported, so as to realizing neighbor cell planning. With the neighbor cell planning method based on Thiessen polygons, neighbor cell planning is performed rapidly, saving manpower and time, avoiding the inaccuracy of manual planning, reducing the cost of the neighbor cell planning, and improving the accuracy and efficiency of the neighbor cell planning.

In a possible implementation, the working parameter data includes identifications of the cells, longitudes of the cells, latitudes of the cells, and azimuths of the cells, and the acquiring working parameter data of cells includes: acquiring the working parameter data of the cells from a working parameter data table of an existing network.

In a possible implementation, the adjusting longitudes and latitudes of the cells based on the working parameter data includes: for each of the cells, determining a position of the cell based on the acquired working parameter data; and subjecting the position of the cell to a translational motion toward a direction of an azimuth of the cell to adjust longitude and latitude of the cell.

In a possible implementation, the determining a position of the cell based on the acquired working parameter data and subjecting the position of the cell to a translational motion toward a direction of an azimuth of the cell to adjust longitude and latitude of the cell includes:

adjusting the longitude and latitude of the cell using an offset algorithm according to equations:

$$X(c)=\text{Sin}(\text{Azimuth}(c))*0.00001+\text{Longitude}(c); \text{ and}$$

$$Y(c)=\text{Cos}(\text{Azimuth}(c))*0.00001+\text{Latitude}(c),$$

where:
X(c) represents longitude of a cell C after the translational motion, Y(c) represents latitude of the cell C after the translational motion, and the cell C represents any one of the cells;
Azimuth(c) represents an azimuth of the cell C;
Sin(Azimuth(c))*0.00001 represents a longitude displacement of the cell C;
Cos(Azimuth(c))*0.00001 represents a latitude displacement of the cell C;
Longitude(c) represents original longitude of the cell C; and
Latitude(c) represents original latitude of the cell C.

In a possible implementation, the constructing a Delaunay triangulation based on the adjusted longitudes and latitudes of the cells includes:

determining discrete points for constructing the Delaunay triangulation based on the adjusted longitudes and latitudes of the cells; and
forming triangles in the Delaunay triangulation by every three of the discrete points that are close to each other in a way that each of the discrete points is a vertex of a triangle in the Delaunay triangulation.

In a possible implementation, the generating Thiessen polygons based on the Delaunay triangulation includes:
calculating centers of circumcircles of all triangles in the Delaunay triangulation; and
connecting centers of circumcircles of adjacent triangles to form Thiessen polygons.

In a possible implementation, a principle of forming triangles in the Delaunay triangulation by every three of the discrete points that are close to each other includes:
no other discrete point is inside a circumcircle of any of the triangles in the Delaunay triangulation; and
for a convex quadrangle formed by two adjacent triangles in the Delaunay triangulation, a minimum among six interior angles does not increase when exchanging diagonals of the convex quadrangle.

A neighbor cell planning device based on Thiessen polygons is further provided according to an embodiment of the present disclosure. The device includes a working parameter acquisition unit, a cell discrete point calculation unit, a Delaunay triangulation construction unit, a Thiessen polygon plot unit and a neighbor cell output unit.

The working parameter acquisition unit is configured to acquire working parameter data of cells.

The cell discrete point calculation unit is configured to adjust longitudes and latitudes of the cells based on the working parameter data of the cells.

The Delaunay triangulation construction unit is configured to construct a Delaunay triangulation based on the adjusted longitudes and latitudes of the cells.

The Thiessen polygon plot unit is configured to generate Thiessen polygons based on the Delaunay triangulation.

The neighbor cell output unit is configured to calculate neighbor cells of each cell based on the Thiessen polygons and export a list of neighbor cells for each cell.

In a possible implementation, the working parameter data includes: identifications of the cells, longitudes of the cells, latitudes of the cells, and azimuths of the cells, and the working parameter acquisition unit is further configured to acquire the working parameter data of the cells from on a working parameter data table of an existing network.

In a possible implementation, the cell discrete point calculation unit is further configured to:
for each of the cells, determine a position of the cell based on the acquired working parameter data; and subject the position of the cell to a translational motion toward a direction of an azimuth of the cell to adjust longitude and latitude of the cell.

In a possible implementation, the cell discrete point calculation unit is configured to adjust the longitude and latitude of the cell using an offset algorithm according to equations:

$$X(c)=\text{Sin}(\text{Azimuth}(c))*0.00001+\text{Longitude}(c); \text{ and}$$

$$Y(c)=\text{Cos}(\text{Azimuth}(c))*0.00001+\text{Latitude}(c),$$

where:
X(c) represents longitude of a cell C after the translational motion, Y(c) represents latitude of the cell C after the translational motion, and the cell C represents any one of the cells;
Azimuth(c) represents an azimuth of the cell C;
Sin(Azimuth(c))*0.00001 represents a longitude displacement of the cell C;
Cos(Azimuth(c))*0.00001 represents a latitude displacement of the cell C;
Longitude(c) represents original longitude of the cell C; and
Latitude(c) represents original latitude of the cell C.

In a possible implementation, the Delaunay triangulation construction unit is further configured to:
determine discrete points for constructing the Delaunay triangulation based on the adjusted longitudes and latitudes of the cells; and
form triangles in the Delaunay triangulation by every three of the discrete points that are close to each other in a way that each of the discrete points is a vertex of a triangle in the Delaunay triangulation.

In a possible implementation, the Thiessen polygon plot unit is further configured to:
calculate centers of circumcircles of all triangles in the Delaunay triangulation; and
connect centers of circumcircles of adjacent triangles to form Thiessen polygons.

In a possible implementation, a principle of form triangles in the Delaunay triangulation by every three of the discrete points that are close to each other includes:
no other discrete point is inside a circumcircle of any of the triangles in the Delaunay triangulation; and
for a convex quadrangle formed by two adjacent triangles in the Delaunay triangulation, a minimum among six interior angles does not increase when exchanging diagonals of the convex quadrangle.

Compared with the conventional technology, the embodiments of the present disclosure have the following beneficial effects.

With the neighbor cell planning method based on Thiessen polygons, neighbor cell planning is performed rapidly, saving manpower and time, avoiding the inaccuracy of manual planning, reducing the cost of the neighbor cell planning, and improving the accuracy and efficiency of the neighbor cell planning.

BRIEF DESCRIPTION OF THE DRAWINGS

The technical solutions according to the present disclosure are described below in conjunction with the drawings.

DETAILED DESCRIPTION OF EMBODIMENTS

In order to facilitate the understanding of the present disclosure, the present disclosure is described in detail below in conjunction with the drawings and embodiments. The embodiments are only used for interpreting the present disclosure rather than limiting the scope of the present disclosure.

Embodiment 1

Figure 1:
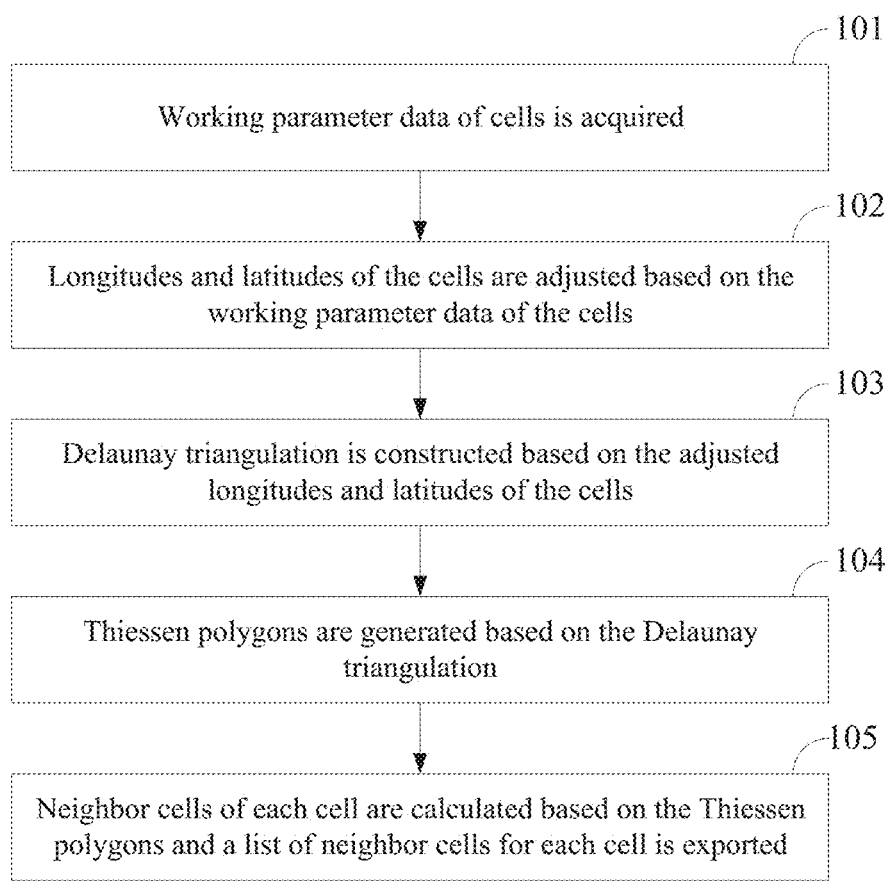
FIG. 1 is a schematic diagram of a neighbor cell planning method based on Thiessen polygons according to embodiments 1 and 2 of the present disclosure.

As shown in FIG. 1, a neighbor cell planning method based on Thiessen polygons is provided according to this embodiment of the present disclosure. The method includes the following steps 101 to 105.

In step 101, working parameter data of cells is acquired. The working parameter data of the cells may be acquired directly based on an engineering parameter table of an existing network. The working parameter data includes: identifications of the cells, longitudes of the cells, latitudes of the cells, and azimuths of the cells.

When neighbor cell planning is to be performed, a neighbor cell planning device for performing the neighbor cell planning method based on Thiessen polygons acquires the working parameter data.

In step 102, longitudes and latitudes of the cells are adjusted based on the working parameter data of the cells.

Figure 2:
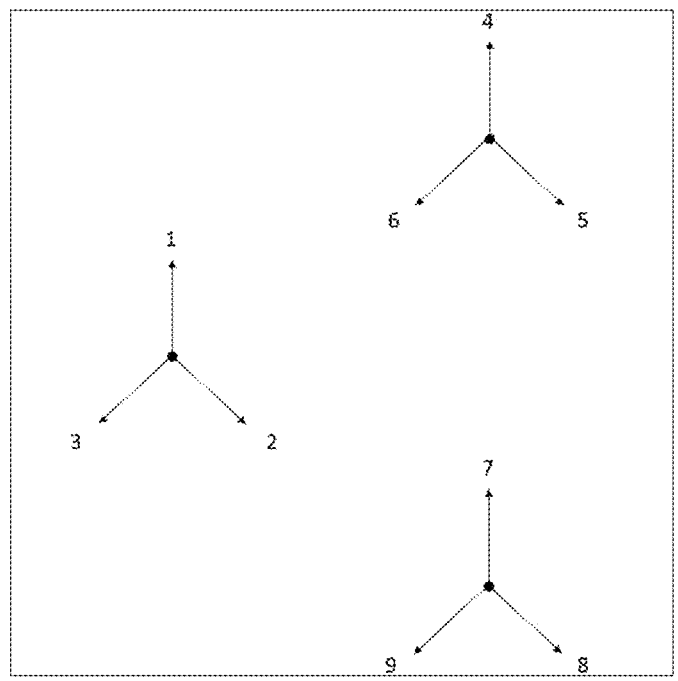
FIG. 2 is a schematic diagram showing positions and directions of cells according to the embodiment 1 of the present disclosure.
Figure 3:
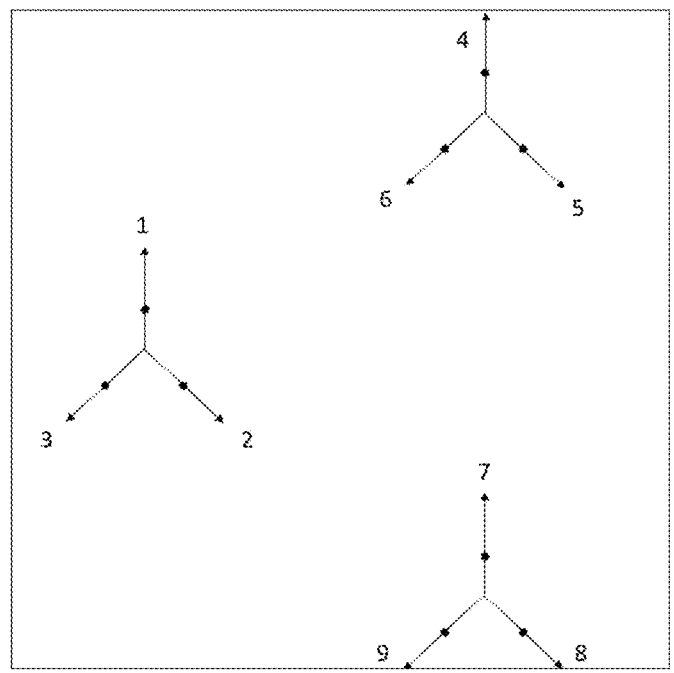
FIG. 3 is a schematic diagram showing translation of the positions of the cells according to the embodiment 1 of the present disclosure.

Each base station generally covers three cells having same latitude and longitude, and hence Thiessen polygons cannot be drawn in unit of cells, as shown in FIG. 2. Therefore, it is required to adjust the longitudes and latitudes of the cells to be different, as shown in FIG. 3. For each cell, a position of the cell is subjected to a translational motion by a short distance toward a direction of an azimuth of the cell to adjust the longitude and latitude of the cell. The longitude and latitude of the cell may be adjusted with an offset algorithm according to the following equations:

$$X(c)=\mathrm{Sin}(\mathrm{Azimuth}(c))*0.00001+\mathrm{Longitude}(c);\ \text{and}$$

$$Y(c)=\mathrm{Cos}(\mathrm{Azimuth}(c))*0.00001+\mathrm{Latitude}(c),$$

where X(c) represents longitude of a cell C after the translational motion, Y(c) represents latitude of the cell C after the translational motion, and the cell C represents any one of the cells.

Azimuth(c) represents the azimuth of the cell C.

Sin(Azimuth(c))*0.00001 represents a longitude displacement of the cell C.

Cos(Azimuth(c))*0.00001 represents a latitude displacement of the cell C.

Longitude(c) represents original longitude of the cell C, namely, longitude in the working parameter data, which may be understood as longitude of an antenna.

Latitude(c) represents original latitude of the cell C, namely, latitude in the working parameter data, which may be understood as latitude of the antenna.

In step 103, a Delaunay triangulation is constructed based on the adjusted longitudes and latitudes of the cells.

Figure 4:
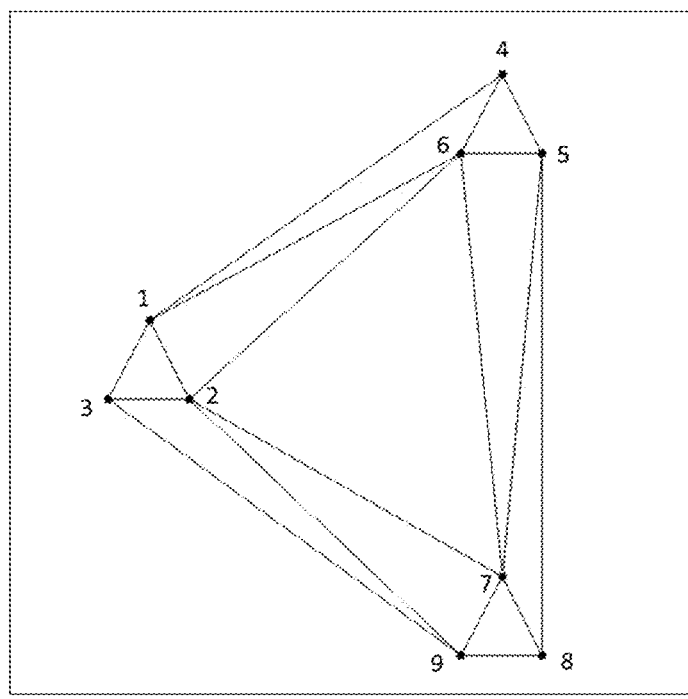
FIG. 4 is a schematic diagram showing construction of a Delaunay triangulation according to the embodiment 1 of the present disclosure.

The construction of the Delaunay triangulation is also referred to as construction of an irregular triangulation, that is, construction of a triangulation from discrete points, as shown in FIG. 4. In constructing the Delaunay triangulation, it is to be determined which three data points are to be used in forming a triangle, which is also referred to as automatic link of a triangulation.

The Delaunay triangulation may be constructed based on the adjusted longitudes and latitudes of the cells as follows:
determining discrete points for constructing the Delaunay triangulation based on the adjusted longitudes and latitudes of the cells; and forming triangles in the Delaunay triangulation by every three of the discrete points that are close to each other in a way that each of the discrete points is a vertex of a triangle in the Delaunay triangulation.

Based on the adjusted longitudes and latitudes of the cells, the discrete points for constructing the Delaunay triangulation are obtained. In this embodiment, each group of adjusted longitude and latitude of a cell forms one discrete point. For n discrete points on the plane, coordinates of each of the n discrete points are represented as (xi,yi), where i=1, 2, . . . , n. Every three discrete points close to each other are selected from the n discrete points to form an optimal triangle in the Delaunay triangulation, so that each of the discrete points is a vertex of a triangle in the Delaunay triangulation.

As shown in FIG. 4A, result of automatic link of the triangulation is presented as labels of three vertices of each triangle, for example, 1, 2, 3; 1, 2, 6; 2, 6, 7; . . . .

In order to obtain the optimal triangle, in construction of the Delaunay triangulation, it is required to make three interior angles of each Delaunay triangle to be acute as far as possible, that is, a principle of generating Delaunay triangle is required to be met. The principle includes:

1) no other discrete point is inside a circumcircle of any Delaunay triangle; and 2) for a convex quadrangle formed by two adjacent triangles in the Delaunay triangulation, a minimum among six interior angles does not increase when exchanging diagonals of the convex quadrangle.

The Delaunay triangle refers to a triangle in the Delaunay triangulation.

In step 104, Thiessen polygons are generated based on the Delaunay triangulation.

Figure 5:
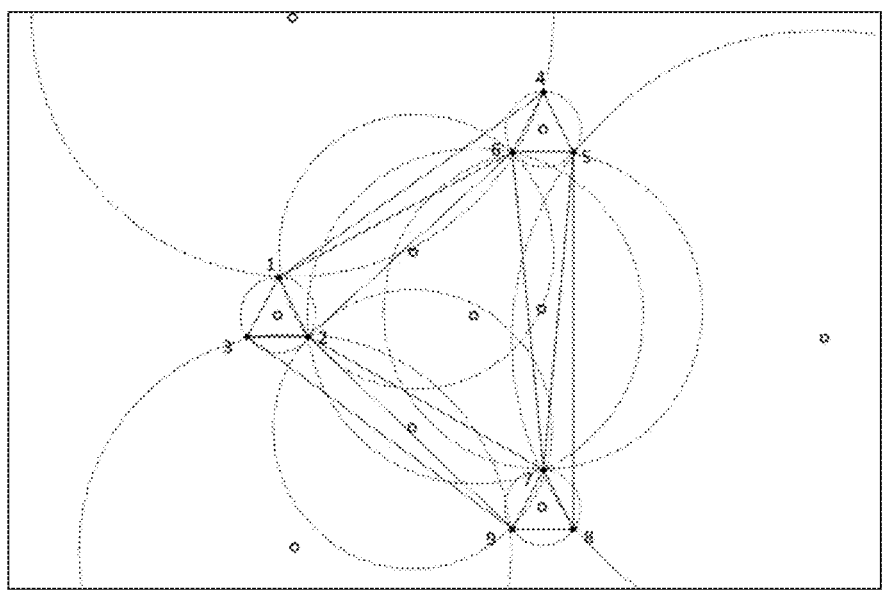
FIG. 5 is a schematic diagram showing calculation of centers of circumcircles of Delaunay triangles according to the embodiment 1 of the present disclosure.

Centers of circumcircles of all triangles in the Delaunay triangulation are calculated, as shown in FIG. 5, where hollow dots represent the centers of the circumcircles of all triangles.

Figure 6:
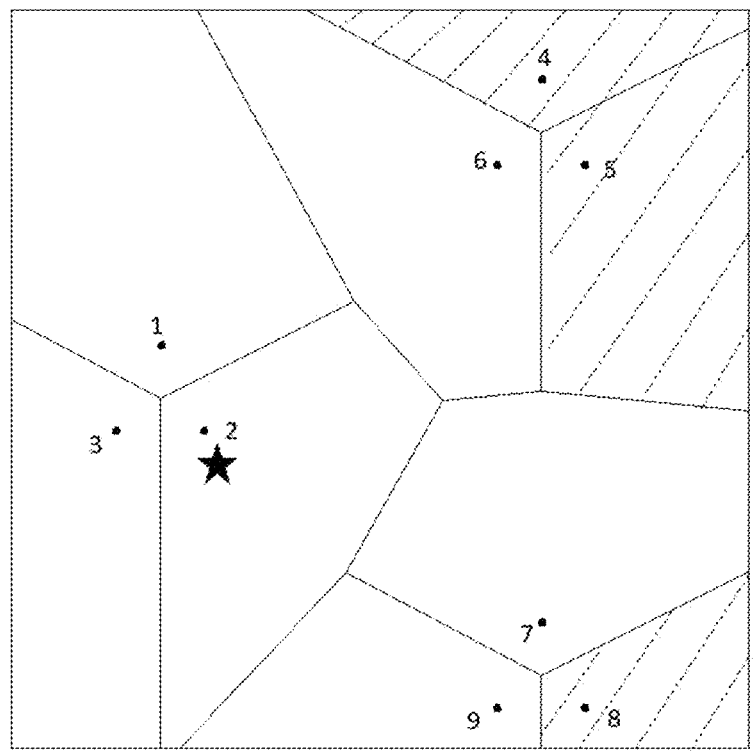
FIG. 6 is a schematic diagram of Thiessen polygons according to the embodiment 1 of the present disclosure.

Centers of circumcircles of adjacent triangles are connected to form Thiessen polygons, as shown in FIG. 6.

In other words, perpendicular bisectors of sides of the triangles form the Thiessen polygons. For a Thiessen polygon at an edge of the triangulation, the Thiessen polygon is formed by perpendicular bisectors of sides of triangles and outlines.

In step 105, neighbor cells of each cell are calculated based on the Thiessen polygons and a list of neighbor cells for each cell is exported.

Data of planned neighbor cells of each cell is acquired based on characteristics of the Thiessen polygons, and a list of neighbor cells including identifications of the neighbor cells is generated. Each cell is mapped to multiple neighbor cells.

With the neighbor cell planning method based on Thiessen polygons, neighbor cell planning is performed rapidly, saving manpower and time, avoiding the inaccuracy of manual planning, reducing the cost of the neighbor cell planning, and improving the accuracy and efficiency of the neighbor cell planning.

Figure 7:
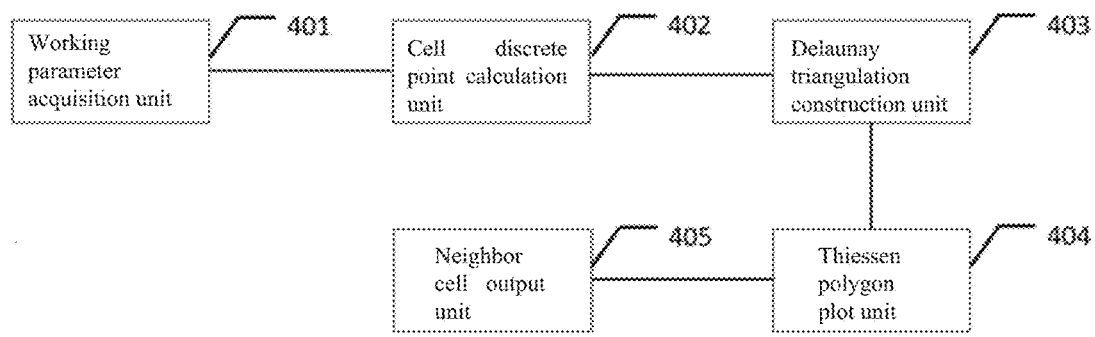
FIG. 7 is a schematic diagram of a neighbor cell planning device based on Thiessen polygons according to the embodiment 1 of the present disclosure.

As shown in FIG. 7, a neighbor cell planning device based on Thiessen polygons is further provided according to an embodiment of the present disclosure. The device includes a working parameter acquisition unit 401, a cell discrete point calculation unit 402, a Delaunay triangulation construction unit 403, a Thiessen polygon plot unit 404, and a neighbor cell output unit 405.

The working parameter acquisition unit 401 transmits data to the cell discrete point calculation unit 402 in a unidirectional manner. The cell discrete point calculation unit 402 transmits data to the Delaunay triangulation construction unit 403 in a unidirectional manner. The Delaunay triangulation construction unit 403 transmits data to the Thiessen polygon plot unit 404 in a unidirectional manner. The Thiessen polygon plot unit 404 transmits data to the neighbor cell output unit 405 in a unidirectional manner.

The working parameter acquisition unit 401 is configured to acquire working parameter data of cells.

The cell discrete point calculation unit 402 is configured to adjust longitudes and latitudes of the cells based on the working parameter data of the cells.

In other words, plane coordinates of discrete points for constructing a Delaunay triangulation are acquired from the acquired working parameter data according to offset algorithm equations.

The Delaunay triangulation construction unit 403 is configured to construct a Delaunay triangulation based on the adjusted longitudes and latitudes of the cells.

The Thiessen polygon plot unit 404 is configured to generate Thiessen polygons based on the Delaunay triangulation.

The neighbor cell output unit 405 is configured to calculate neighbor cells of each cell based on the Thiessen polygons and export a list of neighbor cells for each cell.

In other words, data of planned neighbor cells of the cell is acquired based on characteristics of the Thiessen polygons and the list of neighbor cells including identifications of the neighbor cells is generated. Each cell is mapped to multiple neighbor cells.

In a possible implementation, the working parameter data includes identifications of the cells, longitudes of the cells, latitudes of the cells, and azimuths of the cells.

The working parameter acquisition unit is further configured to acquire working parameter data of the cells from a working parameter data table of an existing network.

In a possible implementation, the cell discrete point calculation unit is further configured to, for each cell, determine a position of the cell based on the acquired working parameter data, and subject the position of the cell to a translational motion toward a direction of an azimuth of the cell to adjust longitude and latitude of the cell.

In a possible implementation, the cell discrete point calculation unit is configured to, for each cell, adjust longitude and latitude of the cell using an offset algorithm according to the following equations:

$$X(c)=\text{Sin}(\text{Azimuth}(c))*0.00001+\text{Longitude}(c);$$

$$Y(c)=\text{Cos}(\text{Azimuth}(c))*0.00001+\text{Latitude}(c),$$

where X(c) represents longitude of a cell C after the translational motion, Y(c) represents latitude of the cell C after the translational motion, and the cell C represents any one of the cells.

Azimuth(c) represents the azimuth of the cell C.

Sin(Azimuth(c))*0.00001 represents a longitude displacement of the cell C.

Cos(Azimuth(c))*0.00001 represents a latitude displacement of the cell C.

Longitude(c) represents original longitude of the cell C.

Latitude(c) represents original latitude of the cell C.

In a possible implementation, the Delaunay triangulation construction unit is further configured to:

determine discrete points for constructing the Delaunay triangulation based on the adjusted longitudes and latitudes of the cells; and form triangles in the Delaunay triangulation by every three of the discrete points that are close to each other in a way that each of the discrete points is a vertex of a triangle in the Delaunay triangulation.

In a possible implementation, the Thiessen polygon plot unit is further configured to:

calculate centers of circumcircles of all triangles in the Delaunay triangulation; and connect centers of circumcircles of adjacent triangles to form the Thiessen polygons.

In a possible implementation, a principle of forming triangles in the Delaunay triangulation by every three of the discrete points that are close to each other includes that:

no other discrete point is inside a circumcircle of any of the triangles in the Delaunay triangulation; and for a convex quadrangle formed by two adjacent triangles in the Delaunay triangulation, a minimum among six interior angles does not increase when exchanging diagonals of the convex quadrangle.

Embodiment 2

Taking FIG. 6 as an example and assuming that a cell 2 is a main cell, a cell corresponding to a polygon adjacent to a polygon boundary of the cell 2 is referred to as a first-layer neighbor cell. That is, cells 1, 3, 6, 7 and 9 are the first-layer neighbor cells of the cell 2, shown as the blank blocks in FIG. 6. The cell 1 and the cell 3 are neighbor cells covered by a same base station. Cells adjacent to the first-layer neighbor cells of the cell 2 are second-layer neighbor cells of the cell 2. That is, cells 4, 5 and 8 are the second-layer neighbor cells of the cell 2, shown as blocks filled with black dotted lines in FIG. 6.

Figure 8:
FIG. 8 is a schematic diagram showing marking on a map with acquired working parameter data of cells according to the embodiment 2 of the present disclosure.

(1) Information of identifications, longitudes, latitudes and azimuths of cells is acquired from an engineering parameter table of an existing network. The following Table 1 shows information of nine cells covered by three base stations in a city, and the nine cells are marked on a map with corresponding positions, as shown in FIG. 8.

(2) The longitudes and latitudes of the cells are adjusted so that every three cells covered by a same base station have completely different longitudes and latitudes. For each cell, an offset to be applied to the cell is calculated according to the following equations to obtain adjusted longitude and latitude of the cell:

$$X(c)=\text{Sin}(\text{Azimuth}(c))*0.00001+\text{Longitude}(c); \text{ and}$$

$$Y(c)=\text{Cos}(\text{Azimuth}(c))*0.00001+\text{Latitude}(c).$$

Figure 9:
FIG. 9 is a schematic diagram showing marking on the map with adjusted longitudes and latitudes of the cells according to the embodiment 2 of the present disclosure.

The adjusted longitudes and latitudes of the cells, listed in Table 2 below, are marked on the map correspondingly, as shown in FIG. 9. The adjusted longitudes and latitudes of the cells in Table 2 are represented by Mercator projection coordinates.

TABLE 1

Information of nine cells covered by three base stations in a city

| Identification of cell | Name of cell | Longitude | Latitude | Azimuth |
|---|---|---|---|---|
| 21055-3394561 | 1 | 117.19838 | 34.27009 | 0 |
| 21055-3394562 | 2 | 117.19838 | 34.27009 | 120 |
| 21055-3394563 | 3 | 117.19838 | 34.27009 | 240 |
| 21055-3394561 | 4 | 117.17 | 34.28 | 0 |
| 21055-3394562 | 5 | 117.17 | 34.28 | 120 |
| 21055-3394563 | 6 | 117.17 | 34.28 | 240 |
| 21055-3394561 | 7 | 117.16 | 34.26 | 0 |
| 21055-3394562 | 8 | 117.16 | 34.26 | 120 |
| 21055-3394563 | 9 | 117.16 | 34.26 | 240 |

TABLE 2

Adjusted longitudes and latitudes of 9 cells covered by 3 base stations in a city

| Identification of cell | Name of cell | Longitude | Latitude | Azimuth |
|---|---|---|---|---|
| 21055-3394561 | 1 | 13047104 | 4064979 | 0 |
| 21055-3394562 | 2 | 13047121 | 4064949 | 120 |
| 21055-3394563 | 3 | 13047087 | 4064949 | 240 |
| 21055-3394561 | 4 | 13043950 | 4066321 | 0 |
| 21055-3394562 | 5 | 13043967 | 4066291 | 120 |
| 21055-3394563 | 6 | 13043933 | 4066291 | 240 |
| 21055-3394561 | 7 | 13042839 | 4063628 | 0 |
| 21055-3394562 | 8 | 13042856 | 4063598 | 120 |
| 21055-3394563 | 9 | 13042821 | 4063598 | 240 |

(3) The nine cells having been subjected to position adjustment serve as nine discrete points for constructing a Delaunay triangulation, and the Delaunay triangulation is constructed according to the principle of constructing a Delaunay triangulation.

Figure 10:
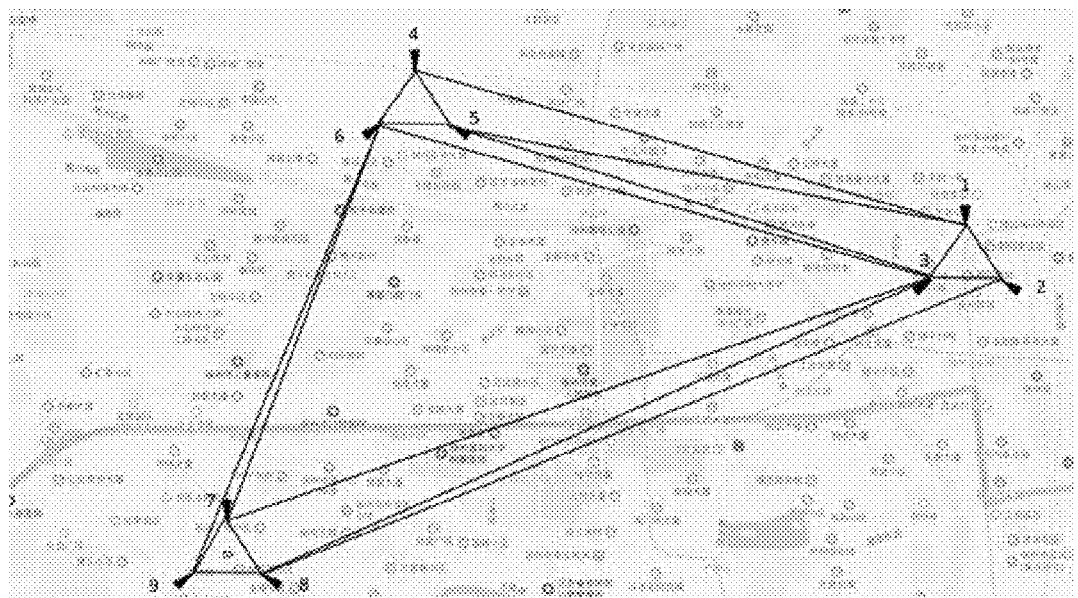
FIG. 10 is a schematic diagram showing marking on the map after construction of the Delaunay triangulation according to the embodiment 2 of the present disclosure.

Longitudes and latitudes of three vertices of each triangle in the Delaunay triangulation, shown in Table 3 below, are marked on the map correspondingly, as shown in FIG. 10.

(4) Centers of circumcircles of each of the triangles in the Delaunay triangulation are calculated. For each discrete point, centers of circumcircles of triangles adjacent to the discrete point are connected to obtain a Thiessen polygon. Thiessen polygons at edge of the triangulation are formed by intersecting perpendicular bisectors of sides of triangles with outlines.

Figure 11:
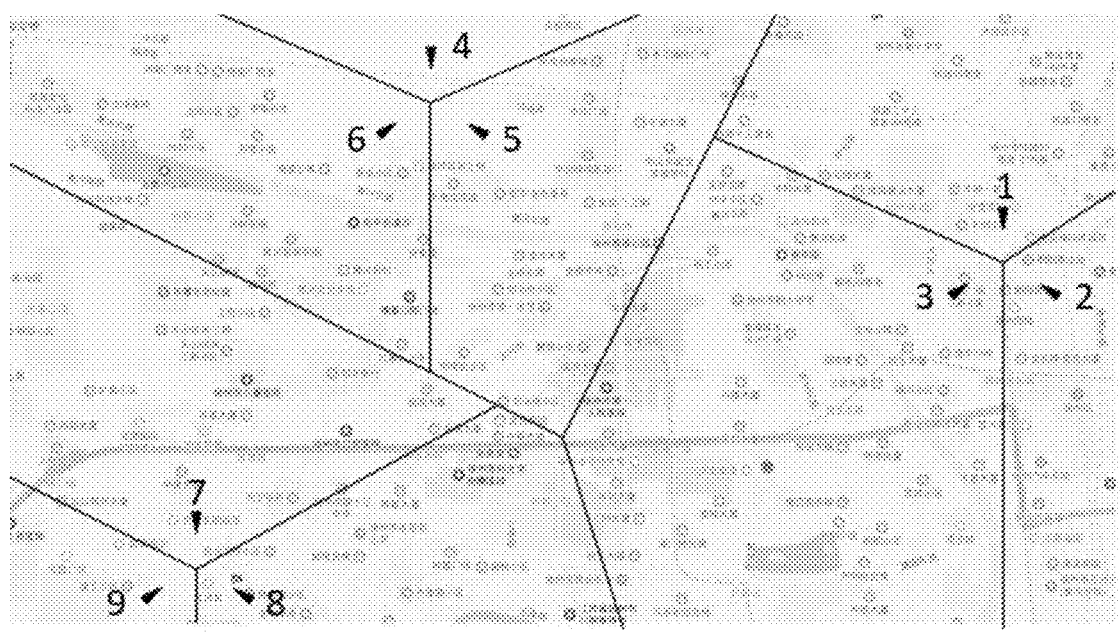
FIG. 11 is a schematic diagram showing marking on the map based on longitudes and latitudes of vertices of the Thiessen polygons according to the embodiment 2 of the present disclosure.

Latitudes and longitudes of vertices of the Tyson polygons are shown in table 4 below and the vertices are marked on the map correspondingly, as shown in FIG. 11. Corresponding vertices are connected according to the rule.

(5) After the Tyson polygons are generated, neighbor cells of each cell are calculated. Assuming that the cell 3 is the main cell, a cell corresponding to a polygon adjacent to a polygon boundary of the cell 3 is referred to as a first-layer neighbor cell. That is, cells 1, 2, 5, and 8 are the first-layer neighbor cells of the cell 3. The cell 1 and the cell 2 are neighbor cells covered by a same base station. Cells adjacent to the first-layer neighbor cells of the cell 3 are second-layer neighbor cells of the cell 3. That is, cells 4, 6, 7 and 9 are the second-layer neighbor cells of the cell 3.

The geographical places in FIGS. 8 to 11 are schematic and do not limit implementation of the solution.

TABLE 3

Longitudes and latitudes of three vertices of each triangle in the Delaunay triangulation of cells

| Identification of triangle | Longitude of vertex 1 | Latitude of vertex 1 | Longitude of a vertex 2 | Latitude of vertex 2 | Longitude of a vertex 3 | Latitude of vertex 3 |
|---|---|---|---|---|---|---|
| 1 | 13047087 | 4064949 | 13042856 | 4063598 | 13047121 | 4064949 |
| 2 | 13043967 | 4066291 | 13042856 | 4063598 | 13047087 | 4064949 |
| 3 | 13042839 | 4063628 | 13042856 | 4063598 | 13043967 | 4066291 |
| 4 | 13043967 | 4066291 | 13047087 | 4064949 | 13047104 | 4064979 |
| 5 | 13042839 | 4063628 | 13042821 | 4063598 | 13042856 | 4063598 |
| 6 | 13043933 | 4066291 | 13042839 | 4063628 | 13043967 | 4066291 |
| 7 | 13043950 | 4066321 | 13043967 | 4066291 | 13047104 | 4064979 |
| 8 | 13042821 | 4063598 | 13042839 | 4063628 | 13043933 | 4066291 |

TABLE 4

Longitudes and latitudes of vertices of Tyson polygons

| Longitude and latitude | Number | | | | | | | | |
|---|---|---|---|---|---|---|---|---|---|
| | 1 | 2 | 3 | 4 | 5 | 6 | 7 | 8 | 9 |
| Longitude of vertex 1 | 13042521 | 13044445 | 13042839 | 13043386 | 13044514 | 13044961 | 13045283 | 13047421 | 13047104 |
| Latitude of vertex 1 | 4063798 | 4064518 | 4063298 | 4066621 | 4066621 | 4064305 | 4063298 | 4065139 | 4063298 |
| Longitude of vertex 2 | 13042839 | 13042839 | 13042839 | 13043950 | 13043950 | 13044445 | 13044961 | 13047104 | 13047104 |
| Latitude of vertex 2 | 4063608 | 4063608 | 4063608 | 4066301 | 4066301 | 4064518 | 4064305 | 4064959 | 4064959 |
| Longitude of vertex 3 | 13042839 | 13042521 | 13044445 | 13043950 | 13043386 | 13043950 | 13045608 | 13045608 | 13047421 |
| Latitude of vertex 3 | 4063298 | 4063798 | 4064518 | 4064728 | 4066621 | 4064728 | 4065807 | 4065807 | 4065139 |

TABLE 4-continued

Longitudes and latitudes of vertices of Tyson polygons

| Longitude and latitude | Number | | | | | | | | |
|---|---|---|---|---|---|---|---|---|---|
| | 1 | 2 | 3 | 4 | 5 | 6 | 7 | 8 | 9 |
| Longitude of vertex 4 | 13042521 | 13042521 | 13044961 | 13042521 | | 13043950 | 13047104 | 13045948 | 13047421 |
| Latitude of vertex 4 | 4063298 | 4065315 | 4064305 | 4065315 | | 4066301 | 4064959 | 4066621 | 4063298 |
| Longitude of vertex 5 | | 13043950 | 13045283 | 13042521 | | 13044514 | 13047104 | 13047421 | |
| Latitude of vertex 5 | | 4064728 | 4063298 | 4066621 | | 4066621 | 4063298 | 4066621 | |
| Longitude of vertex 6 | | | | | | 13045948 | | | |
| Latitude of vertex 6 | | | | | | 4066621 | | | |
| Longitude of vertex 7 | | | | | | 13045608 | | | |
| Latitude of vertex 7 | | | | | | 4065807 | | | |

For those skilled in the art, the embodiments are only used for exemplary describing the present disclosure, rather than limiting implementation of the present disclosure. Various non-substantive improvements made to the conception and technical solutions according to the present disclosure, or applications of the conception and the technical solutions according to the present disclosure in other scenarios without improvement fall within the protection scope of the present disclosure.

The invention claimed is:

1. A neighbor cell planning method based on Thiessen polygons, the method comprising:
    acquiring working parameter data of cells;
    adjusting longitudes and latitudes of the cells based on the working parameter data, to make ones of the cells, which have same longitudes and latitudes and are managed by a same base station, to have different adjusted longitudes and latitudes;
    constructing a Delaunay triangulation based on the adjusted longitudes and latitudes of the cells;
    generating Thiessen polygons based on the Delaunay triangulation; and
    calculating neighbor cells of each cell based on the Thiessen polygons and exporting a list of neighbor cells for each cell.

2. The neighbor cell planning method based on Thiessen polygons according to claim 1, wherein
    the working parameter data comprises: identifications of the cells, longitudes of the cells, latitudes of the cells, and azimuths of the cells; and
    the acquiring working parameter data of cells comprises: acquiring the working parameter data of the cells from a working parameter data table of an existing network.

3. The neighbor cell planning method based on Thiessen polygons according to claim 2, wherein the adjusting longitudes and latitudes of the cells based on the working parameter data comprises:
    for each of the cells, determining a position of the cell based on the acquired working parameter data, and subjecting the position of the cell to a translational motion toward a direction of an azimuth of the cell to adjust longitude and latitude of the cell.

4. The neighbor cell planning method based on Thiessen polygons according to claim 3, wherein the determining a position of the cell based on the acquired working parameter data and subjecting the position of the cell to a translational motion toward a direction of an azimuth of the cell to adjust longitude and latitude of the cell comprises:
    adjusting the longitude and latitude of the cell using an offset algorithm according to equations:

$X(c) = \mathrm{Sin}(\mathrm{Azimuth}(c)) * 0.00001 + \mathrm{Longitude}(c)$; and $Y(c) = \mathrm{Cos}(\mathrm{Azimuth}(c)) * 0.00001 + \mathrm{Latitude}(c)$, wherein:
    X(c) represents longitude of a cell C after the translational motion, Y(c) represents latitude of the cell C after the translational motion, and the cell C represents any one of the cells;
    Azimuth(c) represents an azimuth of the cell C;
    Sin(Azimuth(c))*0.00001 represents a longitude displacement of the cell C;
    Cos(Azimuth(c))*0.00001 represents a latitude displacement of the cell C;
    Longitude(c) represents original longitude of the cell C; and
    Latitude(c) represents original latitude of the cell C.

5. The neighbor cell planning method based on Thiessen polygons according to claim 1, wherein the constructing a Delaunay triangulation based on the adjusted longitudes and latitudes of the cells comprises:
    determining discrete points for constructing the Delaunay triangulation based on the adjusted longitudes and latitudes of the cells; and
    forming triangles in the Delaunay triangulation by every three of the discrete points that are close to each other in a way that each of the discrete points is a vertex of a triangle in the Delaunay triangulation.

6. The neighbor cell planning method based on Thiessen polygons according to claim 5, wherein the generating Thiessen polygons based on the Delaunay triangulation comprises:
    calculating centers of circumcircles of all triangles in the Delaunay triangulation; and
    connecting centers of circumcircles of adjacent triangles to form Thiessen polygons.

7. The neighbor cell planning method based on Thiessen polygons according to claim 5, wherein a principle of forming triangles in the Delaunay triangulation by every three of the discrete points that are close to each other comprises that:

no other discrete point is inside a circumcircle of any of the triangles in the Delaunay triangulation; and for a convex quadrangle formed by two adjacent triangles in the Delaunay triangulation, a minimum among six interior angles does not increase when exchanging diagonals of the convex quadrangle.

8. A neighbor cell planning device based on Thiessen polygons, the device comprising:
one or more processors; and
memory having instructions stored thereon, wherein
when executing the instructions the one or more processors are configured to:
acquire working parameter data of cells;
adjust longitudes and latitudes of the cells based on the working parameter data of the cells, to make ones of the cells, which have same longitude and latitude and are managed by a same base station, to have different adjusted longitudes and latitudes;
construct a Delaunay triangulation based on the adjusted longitudes and latitudes of the cells;
generate Thiessen polygons based on the Delaunay triangulation; and
calculate neighbor cells of each cell based on the Thiessen polygons and export a list of neighbor cells for each cell.

9. The neighbor cell planning device based on Thiessen polygons according to claim 8, wherein the working parameter data comprises identification of the cells, longitudes of the cells, latitudes of the cells, and azimuths of the cells; and
when executing the instructions the one or more processors are further configured to acquire the working parameter data of the cells from on a working parameter data table of an existing network.

10. The neighbor cell planning device based on Thiessen polygons according to claim 9, wherein when executing the instructions the one or more processors are further configured to:
for each of the cells, determine a position of the cell based on the acquired working parameter data; and
subject the position of the cell to a translational motion toward a direction of an azimuth of the cell to adjust longitude and latitude of the cell.

11. The neighbor cell planning device based on Thiessen polygons according to claim 10, wherein when executing the instructions the one or more processors are further configured to adjust the longitude and latitude of the cell using an offset algorithm according to equations:

$$X(c)=\text{Sin}(\text{Azimuth}(c))*0.00001+\text{Longitude}(c);\text{ and}$$

$$Y(c)=\text{Cos}(\text{Azimuth}(c))*0.00001+\text{Latitude}(c),$$

wherein:
X(c) represents longitude of a cell C after the translational motion, Y(c) represents latitude of the cell C after the translational motion, and the cell C represents any one of the cells;
Azimuth(c) represents an azimuth of the cell C;
Sin(Azimuth(c))*0.00001 represents a longitude displacement of the cell C;
Cos(Azimuth(c))*0.00001 represents a latitude displacement of the cell C;
Longitude(c) represents original longitude of the cell C; and
Latitude(c) represents original latitude of the cell C.

12. The neighbor cell planning device based on Thiessen polygons according to claim 8, wherein when executing the instructions the one or more processors are further configured to:
determine discrete points for constructing the Delaunay triangulation based on the adjusted longitudes and latitudes of the cells; and
form triangles in the Delaunay triangulation by every three of the discrete points that are close to each other in a way that each of the discrete points is a vertex of a triangle in the Delaunay triangulation.

13. The neighbor cell planning device based on Thiessen polygons according to claim 12, wherein when executing the instructions the one or more processors are further configured to:
calculate centers of circumcircles of all triangles in the Delaunay triangulation; and
connect centers of circumcircles of adjacent triangles to form Thiessen polygons.

14. The neighbor cell planning device based on Thiessen polygons according to claim 12, wherein a principle of form triangles in the Delaunay triangulation by every three of the discrete points that are close to each other comprises that:
no other discrete point is inside a circumcircle of any of the triangles in the Delaunay triangulation; and
for a convex quadrangle formed by two adjacent triangles in the Delaunay triangulation, a minimum among six interior angles does not increase when exchanging diagonals of the convex quadrangle.

* * * * *